United States Patent
Lin et al.

(10) Patent No.: US 7,475,348 B2
(45) Date of Patent: Jan. 6, 2009

(54) METHOD AND APPARATUS FOR DISPLAYING REAL-TIME MESSAGES BY A MOUSE CURSOR

(75) Inventors: Chih-Sih Lin, Taipei (TW); Yi-Hung Shen, Taipei (TW)

(73) Assignee: Compal Electronics, Inc., Taipei (TW)

( * ) Notice: Subject to any disclaimer, the term of this patent is extended or adjusted under 35 U.S.C. 154(b) by 375 days.

(21) Appl. No.: 11/208,776

(22) Filed: Aug. 22, 2005

(65) Prior Publication Data

US 2006/0190832 A1 Aug. 24, 2006

(30) Foreign Application Priority Data

Feb. 18, 2005 (TW) ............................... 94104957 A

(51) Int. Cl.
*G06F 3/048* (2006.01)
(52) U.S. Cl. ....................................... 715/711; 715/715
(58) Field of Classification Search ................. 715/711, 715/715, 808, 856, 859, 860
See application file for complete search history.

(56) References Cited

U.S. PATENT DOCUMENTS 5,307,086 A * 4/1994 Griffin et al. ................. 715/808
6,018,343 A * 1/2000 Wang et al. .................. 715/733
6,459,440 B1 * 10/2002 Monnes et al. .............. 715/808

FOREIGN PATENT DOCUMENTS

JP 405035436 A * 2/1993

* cited by examiner

*Primary Examiner*—Weilun Lo
*Assistant Examiner*—Truc T Chuong
(74) *Attorney, Agent, or Firm*—Thomas, Kayden, Horstemeyer & Risley

(57) ABSTRACT

A method and apparatus for displaying real-time messages by a mouse cursor are disclosed. A setting unit sets a trigger condition for an event, and a monitoring unit monitors the event according to the trigger condition and thus generates a monitor result. A determining unit determines whether the event is triggered according to the conditions and the monitor result. When the event is triggered, a displaying unit displays a message on or near a mouse cursor to remind a user of the triggered event.

7 Claims, 4 Drawing Sheets

METHOD AND APPARATUS FOR DISPLAYING REAL-TIME MESSAGES BY A MOUSE CURSOR

RELATED APPLICATIONS

The present application is based on, and claims priority from, Taiwan Application Ser. No. 94104957, filed Feb. 18, 2005, the disclosure of which is hereby incorporated by reference herein in its entirety.

BACKGROUND

1. Field of Invention

The present invention relates to a computer system with a real-time reminding function. More particularly, the present invention relates to a method and apparatus for displaying real-time messages by a mouse cursor.

2. Description of Related Art

Computers become increasingly more essential for work as the computers have been developed and made available to all. Much important information, such as meeting and work schedule notices, network remote messages, and computer system status update, can be transferred or provide notices to users. However, a user might ignore important information due to his business, or instead, might waste his time by constantly monitoring a certain computer process for new information.

For example, in order not to miss some urgent business information or meeting/work schedule notices, a user needs to frequently check the receiving program, interrupting his normal work. If the user has to constantly remind himself to check his schedule because the computer is unable to automatically notify the user of certain information, the computer is not a useful time-management tool.

Furthermore, modern software generally facilitates real-time notification by displaying a reminder on the screen when an event is triggered or a message is received. Nonetheless, different software applications have different notification mechanisms, and when several of these software applications are installed in a computer system, the system resources are unduly encumbered and system interaction with the user is very complicated. A conventional notification mechanism is usually implemented by simple images or voices. For example, a message like "You have new e-mail" is used in a mail system for notification, but whether the mail is one that the user is waiting for is indiscernible from the foregoing message. Conventional notification mechanisms used for meeting/work schedule notices have the same drawback. The user can only realize that one meeting or work period will begin but still does not instantly realize what the agenda is of the meeting or work until opening and using the relative software application, yielding only a little further information but wasting time and mind.

In addition, in the conventional notification mechanisms, the reminder generally is displayed on a fixed position on the screen, such as the system tray at the bottom of the screen. Alternatively, another software is provided, which uses a digital version of the famous canary yellow note to remind the user to do something, to capture an idea or to organize important phone numbers, from the computer desktop. However, the post-it software merely displays simple notes rather than dynamically displaying the full content of an event notice. In particular, the foregoing reminders are not eye-catching enough to be effectively noticed by the user. The user instead ignores them because he is so concentrated on his work. Therefore, a new notification mechanism is needed, which is real-time and eye-catching.

SUMMARY

It is therefore an aspect of the present invention to provide a method for displaying real-time messages by a mouse cursor, by which the user can preset reminders, so as to prevent inconvenience of frequently checking his meeting/work schedule notices, network remote messages or computer system status update.

It is another aspect of the present invention to provide an apparatus for displaying real-time messages by a mouse cursor, which displays reminders on the most noticeable position of a screen, achieving real-time and eye-catching notification.

In accordance with the foregoing and other objectives of the present invention, a method and apparatus for displaying real-time messages by a mouse cursor are provided. The apparatus has a setting unit, a monitoring unit, a determining unit and a displaying unit. A setting unit sets a trigger condition for an event, and a monitoring unit monitors the event according to the trigger condition and thus generates a monitor result. A determining unit determines whether the event is triggered according to the conditions and the monitor result. When the event is triggered, a displaying unit displays a message on or near a mouse cursor to remind a user of the triggered event.

According to one preferred embodiment of the present invention, the event is a computer system status update or a meeting or work schedule notice. The setting unit further sets the message, and the message is text, a graph, an image, a voice, a hyperlink or a combination thereof. The monitoring unit issues the monitor result according to a clock status or a warning threshold corresponding to the event from an operating system. The displaying unit displays the message by changing the mouse cursor, scrolling text, or popping up or attaching a window, which can be fading, translucent or opaque.

Moreover, when at least two events are triggered simultaneously, the displaying unit displays their corresponding messages together, alternately or randomly. The setting unit can set the priority of displaying these messages. In addition, the apparatus further comprises a storage unit, which stores a plurality of predetermined events and predetermined trigger conditions of the predetermined events for the setting unit to select the event and the trigger condition.

According to another preferred embodiment of the present invention, the apparatus further comprises a first memory, a second memory and a timer. The message is stored in the first memory and is sent from the first memory to the second memory when the event is triggered. The timer starts to count a stay time of the mouse cursor after the event is triggered, and the displaying unit displays the message stored in the second memory until the stay time exceeds a predetermined value. Additionally, when the mouse cursor is moved, the displaying unit clears the message, and the timer resets the stay time to zero for recounting the stay time.

The invention displays reminders on the most noticeable position of the screen, i.e. the position on or near the mouse cursor. As compared with the conventional reminders displayed on the fixed position, the reminders of the invention can immediately and effectively catch the attention of a user. Moreover, a user can ascertain whether an incoming message is one he is waiting for by the method of the present invention instead of the conventional method which makes incoming messages indiscernible from one another. In addition, the invention also can remind of certain moments of a schedule in advance, preventing the user from missing important events.

It is to be understood that both the foregoing general description and the following detailed description are examples and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1A:
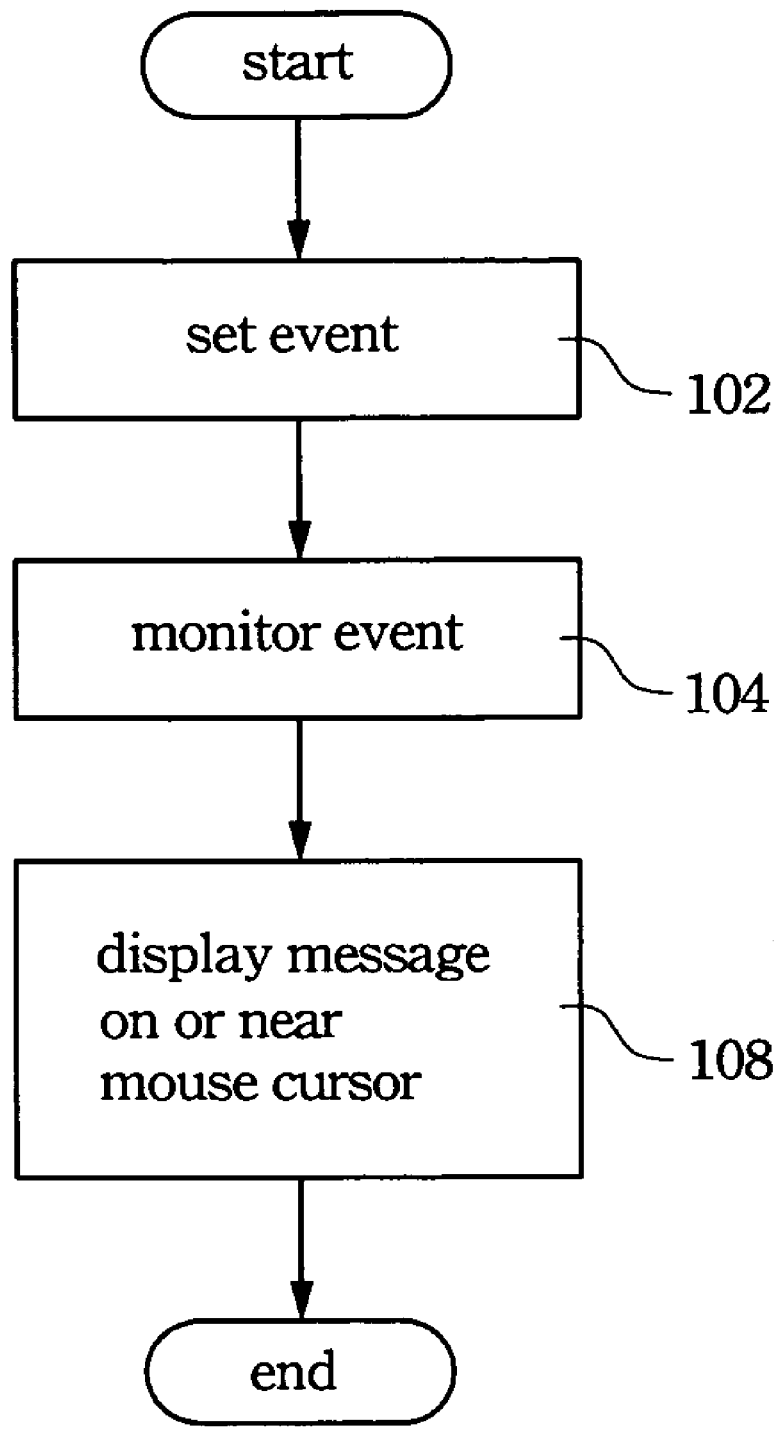
FIG. 1A is a flow chart of one preferred embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 1B:
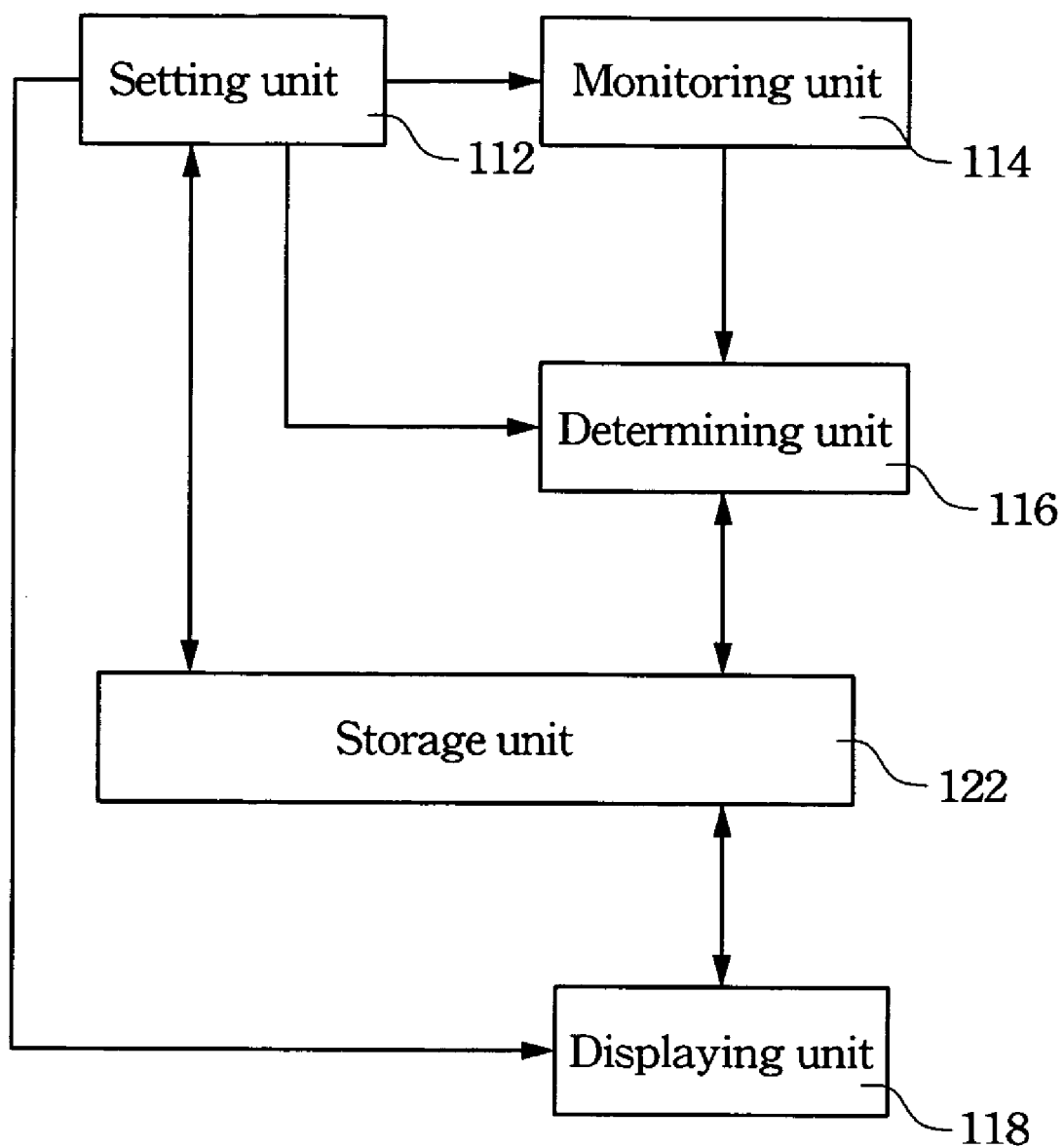
FIG. 1B is a schematic view of one preferred embodiment of the present invention.

FIG. 1A is a flow chart of one preferred embodiment of the present invention, and FIG. 1B is a schematic view of one preferred embodiment of the present invention. The following descriptions are made with references to FIG. 1A and FIG. 1B. As illustrated in FIG. 1A and FIG. 1B, the apparatus of the preferred embodiment has a setting unit 112, a monitoring unit 114, a determining unit 116, a displaying unit 118 and a storage unit 122. Generally speaking, these units can include separate portions of one software application, or can be distributed to many portions of several software applications and be integrated together. Furthermore, these units in addition to software can further include hardware, such as the monitoring unit 114 including a sensor (e.g. a thermometer, a current meter, a voltage meter) and the displaying unit 118 including a video card.

The setting unit 112 can set a trigger condition for an event (step 102), and the event can be a computer system status update or a meeting or work schedule notice. The computer system update status includes, for example, the remaining battery power, the device temperature, the CPU load level, the free memory capacity, the free hard drive space, the network transferring status and speed, the system power-saving or idling status, or other system status information about software or hardware of the computer system. The meeting or work schedule notice, for example, is a notice of an upcoming meeting or work period, a message from another person, or a schedule change notice for a meeting or work schedule.

For example, when the event is the computer system status update regards the remaining battery power, the corresponding trigger condition may include a warning threshold of low power, a warning threshold of insufficient power and the current power level, which are applied to define at what condition the apparatus will display the reminder. In another aspect, when the event is the meeting or work schedule notice, the corresponding condition may include the starting time of a meeting or work period and the predetermined amount of time to remind in advance of the starting time.

The storage unit 122 stores a plurality of predetermined events and predetermined trigger conditions of the predetermined events for the setting unit 112 to select the event and the trigger condition therefrom.

The monitoring unit 114 monitors the event according to the trigger condition and generates a monitor result (step 104). In the preferred embodiment, the monitoring unit 114 can issue a monitor result according to a clock status or a warning threshold corresponding to the event from an operating system. If the event relates to the battery remaining power, the monitoring unit 114 can monitor the battery power of the computer system to make the monitor result by the software application or by the operating system itself; if the event relates to the time schedule, the monitoring unit 114 can directly access the system time of the operating system or even obtain the standard time through the internet to make the monitor result.

The determining unit 116 determines whether the event is triggered or not according to the trigger condition and the monitor result, for example, if the battery remaining power is less than the warning threshold of low power or the warning threshold of insufficient power, or if the time equals or is later than a preemptive alarm set for the meeting or work starting time.

When the event is triggered, the displaying unit 118 displays a message corresponding to the event, which is stored in the storage unit 122, on the most noticeable position of the screen (e.g. on or near the position of the mouse cursor) according to an operating mode of a mouse (e.g. a moving status and a staying status), in order to remind a user the event is triggered (step 108). As compared with the conventional reminders displayed on a same fixed position, the reminders of the invention can immediately and effectively catch the attention of the user.

The message can be set by the setting unit 112 or by other message setting units (not illustrated in the figures), and the message can be text, a graph, an image, a voice, a hyperlink or a combination thereof. The displaying unit 118 displays the message by changing the mouse cursor, scrolling text, or by attaching or popping up a window, which is fading, translucent or opaque. Besides reminding, the message further can contain relative content corresponding to the event, and the user thus avoids inconvenience of frequently checking his meeting/work schedule notices and computer system status update, and avoids wasting time and energy for opening and using the software application relating to the reminder.

Moreover, when at least two events are triggered simultaneously, the displaying unit 118 can display their corresponding messages together, alternately or randomly. The setting unit 112 can set the priority of displaying these messages such that the user can firstly be aware of the more important reminder, avoiding missing it because two events are triggered too closely.

Figure 2A:
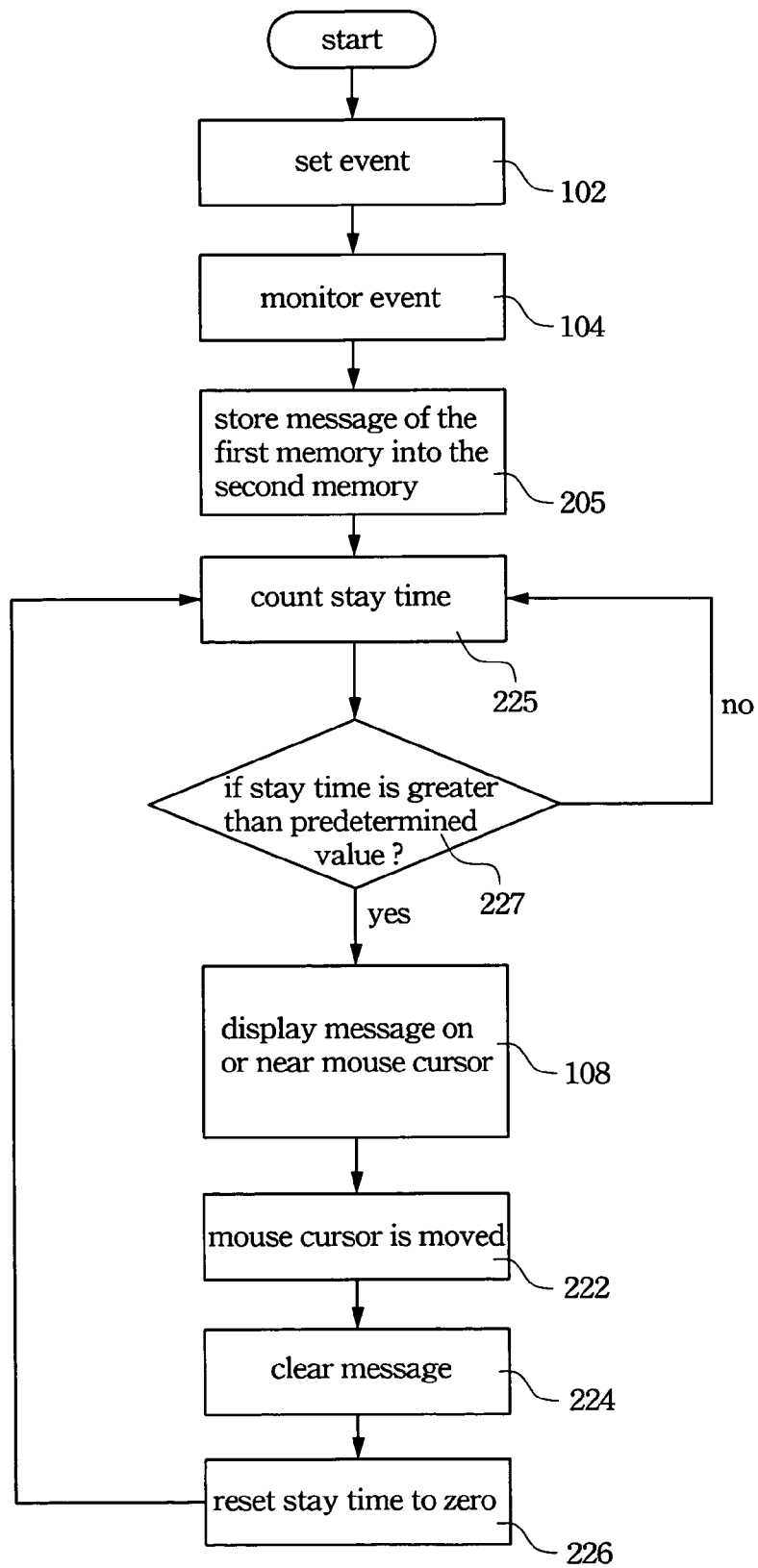
FIG. 2A is a flow chart of another preferred embodiment of the present invention.
Figure 2B:
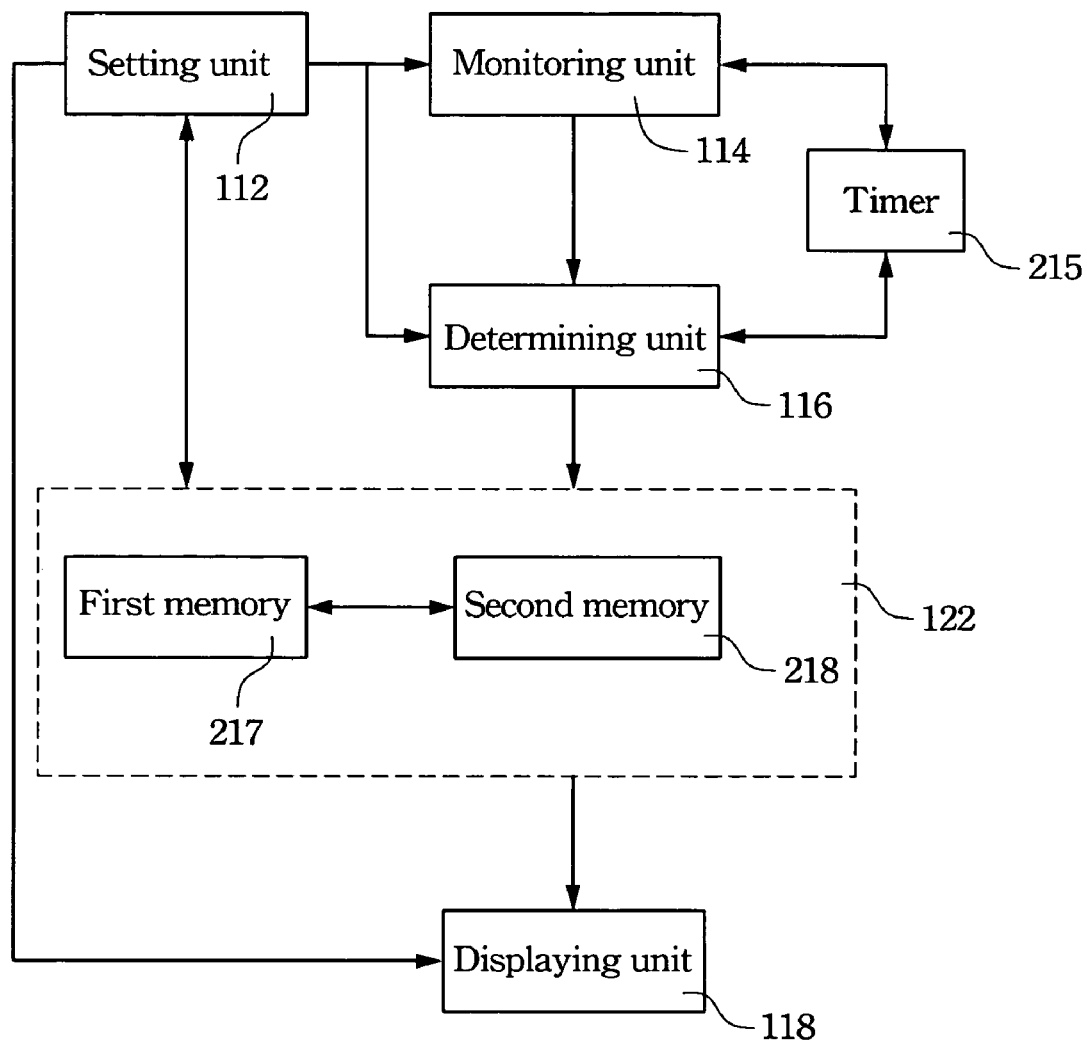
FIG. 2B is a schematic view of another preferred embodiment of the present invention.

FIG. 2A is a flow chart of another preferred embodiment of the present invention, and FIG. 2B is a schematic view of another preferred embodiment of the present invention. The following descriptions are made with references to FIG. 2A and FIG. 2B. As illustrated in FIG. 2A and FIG. 2B, in addition to the setting unit 112, the monitoring unit 114, the determining unit 116, the displaying unit 118 and the storage unit 122 as mentioned in the above embodiment, the apparatus of the preferred embodiment further comprises a timer 215, and the storage unit 122 thereof further comprises a first memory 217 and a second memory 218. The timer 215 can be provided by an application or directly from the clock of the operating system.

In the preferred embodiment, a plurality of predetermined events are stored in the first memory 217. When a trigger signal is received, i.e. the event is triggered, the message in the first memory 217 which corresponds to the event is stored into the second memory 218 (step 205). The timer 215 starts to count a stay time of the mouse cursor after the event is triggered (step 225), and the message stored in the second memory 218 is displayed on the displaying unit 118 (step 118) until the stay time exceeds a predetermined value (step 227). Moreover, the setting unit 112 or another applicable setting unit (not illustrated in the figures) can be used to set the predetermined value for the stay time.

Additionally, when the mouse cursor is moved (step 222), the displaying unit 118 clears the message (step 224), and the timer 215 resets the stay time to zero for recounting the stay time (step 226). In general, a user who suspends using the computer system can more clearly view the position of the mouse cursor. Therefore, the preferred embodiment displays the message on or near the mouse cursor only when the user is idle, achieving the real-time and eye-catching notification.

In summary, the preferred embodiments of the present invention display reminders on the most noticeable position of the screen, i.e. the position on or near the mouse cursor. As compared with the conventional reminders displayed on the same fixed position, the reminders of the invention can immediately and effectively catch the attention of a user. Moreover, the user can ascertain whether an incoming message is one he is waiting for by the method of the present invention instead of the conventional method which makes incoming messages indiscernible from one another. In addition, the invention can also remind of certain moments of a schedule in advance, preventing the user from missing important events.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for displaying real-time messages by a mouse cursor, the method comprising the steps of:
   a. setting a trigger condition for an event, wherein the event is a computer system status update or a meeting or work schedule notice;
   b. monitoring the event according to the trigger condition and generating a monitor result;
   c. storing a message corresponding to the event into a storage unit, wherein the storage unit of the step c comprises a first memory and a second memory, the first memory is arranged to store a plurality of predetermined events and to transfer the corresponding message to the second memory;
   d. determine whether the event is triggered or not according to the trigger condition and the monitor result;
   e. staffing to count a stay time of a mouse cursor;
   f. determining a relation between the stay time and a predetermined value to display the stored message on or near the mouse cursor, wherein the step f displays the message stored in the second memory near the mouse cursor until the stay time exceeds the predetermined value;
   g. clearing the message when the mouse cursor is moved; and
   h. adjusting the stay time, wherein the step h resets the stay time to zero for recounting the stay time.

2. The method as claimed in claim 1, wherein the message is text, a graph, an image, a voice, a hyperlink or a combination thereof.

3. An apparatus for displaying real-time messages by a mouse cursor, the apparatus comprising:
   a setting unit arranged to set a trigger condition for an event, wherein the event is a computer system status update or a meeting or work schedule notice;
   a monitoring unit electrically connected to the setting unit, wherein the monitoring unit is arranged to monitor the event according to the trigger condition and generate a monitor result;
   a determining unit electrically connected to the monitoring unit, wherein the determining unit is arranged to determine whether the event is triggered or not according to the trigger condition and the monitor result;
   a displaying unit electrically connected to the determining unit, wherein when the event is triggered, the displaying unit is arranged to display a message corresponding to the event on or near a mouse cursor according to an operating mode of a mouse, for reminding a user that the event is triggered;
   a storage unit electrically connected to the setting unit, wherein the storage unit comprises:
   a first memory arranged to store the predetermined events; and
   a second memory electrically connected to the first memory, wherein the first memory is arranged to transfer the corresponding message to the second memory after the event being triggered;
   wherein the storage unit is arranged to store a plurality of predetermined events and predetermined trigger conditions of the predetermined events for the setting unit to select the event and the trigger condition; and
   a timer electrically connected to the monitoring unit and the determining unit, wherein the timer is arranged to count and adjust a stay time of the mouse cursor after the event is triggered, and
   wherein the displaying unit is arranged to display the message until the stay time exceeds a predetermined value, wherein when the mouse cursor is moved, the displaying unit is arranged to clear the message, and the timer is arranged to reset the stay time to zero for recounting the stay time.

4. The apparatus as claimed in claim 3, wherein the mode of the mouse comprises a moving status and a staying status.

5. The apparatus as claimed in claim 3, wherein the setting unit is further arranged to set the predetermined value.

6. The apparatus as claimed in claim 3, wherein the monitoring unit is arranged to issue a monitor result according to a clock status or a warning threshold corresponding to the event from an operating system.

7. The apparatus as claimed in claim 3, wherein the setting unit is further arranged to set the message, and the message is text, a graph, an image, a voice, a hyperlink or a combination thereof.

* * * * *